United States Patent [19]
Tsuji et al.

[11] Patent Number: 4,966,940
[45] Date of Patent: Oct. 30, 1990

[54] VULCANIZED, ETHYLENE/ALPHA-OLEFIN COPOLYMER RUBBER COMPOSITION

[75] Inventors: Mitsuji Tsuji; Eiichi Usuda, both of Ichihara; Masashi Aoshima, Ibaraki, all of Japan

[73] Assignee: Sumitomo Chemical Company, Limited, Osaka, Japan

[21] Appl. No.: 360,451

[22] Filed: Jun. 2, 1989

[30] Foreign Application Priority Data

Jun. 17, 1988 [JP] Japan .................................. 63-150944

[51] Int. Cl.$^5$ ...................... C08L 51/04; C08L 51/06; C08L 77/00
[52] U.S. Cl. ........................................ 525/66; 524/504
[58] Field of Search ........................................... 525/66

[56] References Cited

U.S. PATENT DOCUMENTS

| | | | |
|---|---|---|---|
| 4,305,865 | 12/1981 | Okada et al. | 525/66 |
| 4,310,638 | 1/1982 | Coran et al. | 525/183 |
| 4,338,413 | 7/1982 | Coran et al. | 525/66 |
| 4,594,386 | 6/1986 | Olivier | 525/66 |
| 4,602,058 | 7/1986 | Graham et al. | 524/320 |
| 4,757,112 | 7/1988 | Phadke | 525/66 |
| 4,780,358 | 10/1988 | Ito | 525/66 |

FOREIGN PATENT DOCUMENTS

| | | | |
|---|---|---|---|
| 266221 | 5/1988 | European Pat. Off. | 525/66 |
| 55-125153 | 9/1980 | Japan | 525/183 |
| 58-024612 | 2/1983 | Japan | 525/66 |
| 3443959 | 6/1986 | Japan | 525/183 |

OTHER PUBLICATIONS

Coran et al-Rubber-Thermoplastic Compositions, 10/1981-Presented Rub. Div. Am. Chem. Sci. pp. 116-126.

Primary Examiner—Carman J. Seccuro
Attorney, Agent, or Firm—Stevens, Davis, Miller & Mosher

[57] ABSTRACT

A vulcanized, ethylene/α-olefin copolymer rubber composition obtained by vulcanizing an unvulcanized rubber composition comprising 100 parts by weight of a rubber composition consisting of 0–99% by weight of an ethylene/α-olefin copolymer rubber and 100–1% by weight of an ethylene/α-olefin copolymer rubber containing an α,β-unsaturated carboxylic acid and/or a derivative thereof; and 5–100 parts by weight of a polyamide resin, wherein an ethylene/α-olefin copolymer rubber is at least one selected from ethylene/α-olefin copolymers and ethylene/α-olefin/non-conjugated diene copolymers. The vulcanized, ethylene/α-olefin copolymer rubber composition of the present invention has a high hardness and is excellent in weather resistance and thermal resistance as compared with natural rubbers and general-purpose rubbers.

9 Claims, No Drawings

VULCANIZED, ETHYLENE/ALPHA-OLEFIN COPOLYMER RUBBER COMPOSITION

The present invention relates to a vulcanized, ethylene/α-olefin copolymer rubber composition, more particularly, a vulcanized, ethylene/α-olefin copolymer rubber composition having a high hardness.

The vulcanized, ethylene/α-olefin copolymer rubber composition is excellent in weather resistance and thermal resistance as compared with natural rubbers and general-purpose rubbers such as styrene/butadiene rubber, butadiene rubber, isoprene rubber and the like. Therefore, it is widely used for automobile parts, industrial parts, electric parts and the like to make the most of its characteristics.

For some of the above-mentioned uses, the vulcanized, ethylene/α-olefin copolymer rubber composition is practically required to have a high hardness. In order to impart a high hardness to a rubber, heretofore, there have been carried out the addition of a large amount of carbon black in combination with a small amount of process oil, the addition of a reactive alkylphenol resin, the addition of a polyolefin and the like.

The present inventors have investigated a vulcanized, ethylene/α-olefin copolymer rubber composition having a high hardness and, as a result, found a novel vulcanized, ethylene/α-olefin copolymer rubber composition obtained by vulcanizing an unvulcanized rubber composition consisting essentially of an ethylene/α-olefin copolymer rubber; an ethylene/α-olefin copolymer rubber containing an α,β-unsaturated carboxylic acid and/or a derivative thereof; and a polyamide resin.

That is to say, the present invention relates to a vulcanized, ethylene/α-olefin copolymer rubber composition obtained by vulcanizing an unvulcanized rubber composition comprising 100 parts by weight of a rubber composition consisting of 0-99% by weight of an ethylene/α-olefin copolymer rubber and 100-1% by weight of an ethylene/α-olefin copolymer rubber containing an α,β-unsaturated carboxylic acid and/or a derivative thereof; and 5-100 parts by weight of a polyamide resin.

An object of the present invention is to provide a novel vulcanized, ethylene/α-olefin copolymer rubber composition having a high hardness.

Other objects and advantages of the present invention will become apparent from the following description.

In the present invention, the ethylene/α-olefin copolymer rubber (hereinafter referred to as EOR) is at least one selected from ethylene/α-olefin copolymers and ethylene/α-olefin/non-conjugated diene copolymers.

The α-olefin is preferably one having 3-10 carbon atoms and, specifically, includes propylene, 1-butene, 1-pentene, 1-hexene and the like.

The non-conjugated diene includes dicyclopentadiene, ethylidenenorbornene, 1,4-hexadiene, methyltetrahydroindene, methylnorbornene and the like.

The α,β-unsaturated carboxylic acid includes maleic acid, fumaric acid, itaconic acid, citraconic acid, nadic acid and the like. The derivative thereof includes maleic anhydride, citraconic anhydride, nadic anhydride and the like.

The ethylene/α-olefin copolymer rubber containing an α,β-unsaturated carboxylic acid and/or a derivative thereof (hereinafter referred to as the modified EOR) is produced according to the known process such as, for example, the graft copolymerization process stated in Japanese Patent Application Kokoku No. 58-53005 or Japanese Patent Application Kokoku No. 58-445.

Also, the modified EOR may contain an alkenyl aromatic monomer such as styrene, methylstyrene or the like together with the α,β-unsaturated carboxylic acid and/or the derivative thereof each of which is produced according to the process stated in Japanese Patent Application Kokai No. 62-112614 or Japanese Patent Application Kokai No. 64-45413.

The content of the α,β-unsaturated carboxylic acid and/or the derivative thereof in the modified EOR is preferably in a range of 0.1-10% by weight, more preferably in a range of 0.3-7% by weight, most preferably in a range of 0.5-4% by weight, based on the modified EOR. When the content is smaller than 0.1% by weight, the enhancement of hardness is smaller. When, in contrast, the content is larger than 10% by weight, workability, the properties of the vulcanized rubber and the like are deteriorated.

The polyamide resin is not particularly restricted and includes poly-ε-capramide (6-nylon), poly-Ω-undecaneamide (11-nylon), polyhexamethylene adipamide (6,6-nylon), polyhexamethylene sebacamide (6,10-nylon). The polyamide resin can be used irrespective of its molecular weight and whether or not it has amine groups.

The rubber composition comprising the EOR, the modified EOR and the polyamide resin is referred to as the unvulcanized rubber composition.

The content of the polyamide resin in the unvulcanized rubber composition is in a range of 5-100 parts by weight, preferably 10-80 parts by weight based on 100 parts by weight of the rubber compound consisting of 0-99% by weight, preferably 0-90% by weight of the EOR and 100-1% by weight, preferably 100-10% by weight of the modified EOR.

To the unvulcanized rubber composition, further, may be added an additive such as a reinforcing agent, a filler, a softening agent, a plasticizer, a processing aid, a vulcanization accelerator, a vulcanization agent or the like, which are known in the rubber industry.

The unvulcanized rubber composition can be processed according to the conventional process in the rubber industry and can be vulcanized according to the conventional vulcanization process in the rubber industry. Thereby, there can be obtained the vulcanized, ethylene/α-olefin copolymer rubber composition of the present invention.

The vulcanized, ethylene/α-olefin copolymer rubber composition of the present invention can be used for automobile parts or industrial rubber parts.

The present invention will be explained more specifically below referring to Examples and Comparative Examples. The present invention, however, should not be construed to be restricted by the Examples.

EXAMPLES 1-7 and COMPARATIVE EXAMPLES 1-4

A mixture prepared according to the formulation shown in column A of Table 1 was kneaded at a velocity of 60 rpm for 5 min at 250° C. in a Brabender Plastograph having a kneading volume of 350 ml. After cooling, carbon black, process oil and stearic acid were added to the above mixture according to the formulation shown in column B of Table 1 and kneaded at a velocity of 60 rpm for 4 min in the Brabender Plastograph kept at a temperature of 100° C. To the resulting mixture, further, were added a vulcanization agent, a vulcanization accelerator and a vulcanization aid and the like, using a 6-in roll according to the formulation shown in column C of Table 1 and kneaded. The resulting unvulcanized rubber composition was vulcanized by heating for 10 min at a temperature of 170° C. using a vulcanizing press to obtain a sheet of the vulcanized rubber composition having a thickness of 2 mm. Physical properties of the vulcanized rubber composition were measured according to JIS K6301. Results are collectively shown in Table 1.

dicyclopentadiene, ethylidenenorbornene, 1,4-hexadiene, methyltetraindene and methylnorbornene.

5. A vulcanized, ethylene/α-olefin copolymer rubber composition according to claim 1, wherein the α,β-unsaturated carboxylic acid is selected from the group consisting of maleic acid, fumaric acid, itaconic acid, citraconic acid and nadic acid.

6. A vulcanized, ethylene/α-olefin copolymer rubber composition according to claim 1, wherein the derivative of the α,β-unsaturated carboxylic acid is selected from the group consisting of maleic anhydride, citra-

TABLE 1

| Compounding agents (parts by weight) | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| A | EOR I *1 | — | 50 | 50 | 50 | 85 | — | — | 100 | 100 | 50 | — |
| | EOR II *2 | — | — | — | — | — | 80 | 80 | — | — | — | 100 |
| | The modified EOR I *3 | 100 | 50 | 50 | 50 | 15 | — | — | — | — | 50 | — |
| | The modified EOR II *4 | — | — | — | — | — | 20 | — | — | — | — | — |
| | The modified EOR III *5 | — | — | — | — | — | — | 20 | — | — | — | — |
| | Poly-ε-capramide *6 | 30 | 10 | 30 | 70 | 30 | 30 | 30 | — | 30 | — | — |
| B | N550 black | 100 | 100 | 100 | 100 | 100 | 130 | 100 | 100 | 100 | 100 | 130 |
| | Process oil | 50 | 50 | 50 | 50 | 50 | 80 | 50 | 50 | 50 | 50 | 80 |
| | Stearic acid | 1 | 1 | 1 | 1 | 1 | 1 | 1 | 1 | 1 | 1 | 1 |
| C | Zinc stearate | — | — | — | — | — | 1 | 1 | — | — | — | 1 |
| | Dicumyl peroxide | 2.7 | 2.7 | 2.7 | 2.7 | 2.7 | — | — | 2.7 | 2.7 | 2.7 | — |
| | Ethylene dimethacrylate | 2 | 2 | 2 | 2 | 2 | — | — | 2 | 2 | 2 | — |
| | Vulcanization accelerator ZnBDC *7 | — | — | — | — | — | 2 | 2 | — | — | — | 2 |
| | Vulcanization accelerator TMTD *8 | — | — | — | — | — | 0.5 | 0.5 | — | — | — | 0.5 |
| | Vulcanization accelerator DPTH *9 | — | — | — | — | — | 0.5 | 0.5 | — | — | — | 0.5 |
| | Vulcanization accelerator MBT *10 | — | — | — | — | — | 1 | 1 | — | — | — | 1 |
| | Sulfur | — | — | — | — | — | 1.5 | 1.5 | — | — | — | 1.5 |
| Properties of vulcanized rubber | | | | | | | | | | | | |
| Tensile strength (kgf/cm$^2$) | | 131 | 128 | 132 | 121 | 120 | 122 | 145 | 127 | 104 | 121 | 131 |
| Elongation (%) | | 160 | 290 | 200 | 130 | 230 | 290 | 220 | 340 | 250 | 300 | 550 |
| Hardness (JIS-A type) | | 82 | 79 | 82 | 89 | 81 | 75 | 83 | 73 | 78 | 74 | 60 |

*1 Ethylene/propylene copolymer rubber: the content of ethylene = 78% by weight; Mooney viscosity: $ML_{1+4}$ (121° C.) = 25.
*2 Ethylene/propylene/non-cojugated diene copolymer rubber: the content of ethylene = 70% by weight; Non-conjugated diene: ethylidenenorbornene, iodine value = 12; Mooney viscosity: $ML_{1+4}$ (121° C.) = 65.
*3 The modified ethylene/propylene copolymer rubber: the content of ethylene = 76% by weight, the content of maleic anhydride = 1.3% by weight, the content of styrene = 0.8% by weight; Mooney viscosity: $ML_{1+4}$ (121° C.) = 60.
*4 The modified ethylene/propylene copolymer rubber: the content of ethylene = 73% by weight, the content of maleic anhydride = 0.8% by weight; Mooney viscosity: $ML_{1+4}$ (121° C.) = 90.
*5 The modified ethylene/propylene/non-conjugated diene: the content of ethylene = 65% by weight, the content of maleic anhydride = 1.5% by weight, the content of styrene = 1.0% by weight; Non conjugated diene: ethylidenenorbornene, iodine value = 12; Mooney viscosity: $ML_{1+4}$ (121° C.) = 80.
*6 Degree of polymerization: 1100.
*7 Zinc di-n-butyldithiocarbamate.
*8 Tetramethylthiuram disulfide.
*9 Dipentamethylenethiuram hexasulfide.
*10 2-Mercaptobenzothiazole.

What is claimed is:

1. A vulcanized, ethylene/α-olefin copolymer rubber composition obtained by static vulcanizing an unvulcanized rubber composition comprising 100 parts by weight of a rubber composition consisting of 0-99% by weight of an ethylene/α-olefin copolymer rubber and 100-1% by weight of an ethylene/α-olefin copolymer rubber containing any of an α,β-unsaturated carboxylic acid, a derivative thereof or a mixture of an α,β-unsaturated carboxylic acid and a derivative thereof; and 5-100 parts by weight of a polyamide resin, wherein an ethylene/α-olefin copolymer rubber is at least one selected from ethylene/α-olefin copolymers and ethylene/α-olefin/non-conjugated diene copolymers.

2. A vulcanized, ethylene/α-olefin copolymer rubber composition according to claim 1, wherein the α-olefin has 3-10 carbon atoms.

3. A vulcanized, ethylene/a-olefin copolymer rubber composition according to claim 1, wherein the α-olefin is selected from the group consisting of propylene, 1-butene, 1-pentene and 1-hexene.

4. A vulcanized, ethylene/α-olefin copolymer rubber composition according to claim 1, wherein the non-conjugated diene is selected from the group consisting of conic anhydride and nadic anhydride.

7. A vulcanized, ethylene/α-olefin copolymer rubber composition according to claim 1, wherein the content of any of the α,β-unsaturated carboxylic acid, the derivative thereof or the mixture of the α,β-unsaturated carboxylic acid and the derivative thereof is 0.1-10% by weight based on the ethylene/α-olefin copolymer rubber containing any of the α,β-unsaturated carboxylic acid, the derivative thereof or the mixture of the α,β-unsaturated carboxylic acid and the derivative thereof.

8. A vulcanized, ethylene/α-olefin copolymer rubber composition according to claim 1, wherein the polyamide resin is selected from the group consisting of poly-ε-capramide, poly-Ω-undecaneamide, polyhexamethylene adipamide and polyhexamethylene sebacamide.

9. A vulcanized, ethylene/α-olefin copolymer rubber composition according to claim 1, wherein the unvulcanized rubber composition further contains at least one selected from the group consisting of a reinforcing agent, a filler, a softening agent, a plasticizer, a processing aid, a vulcanizing accelerator and a vulcanizing agent.

* * * * *